(12) United States Patent
 Zhou et al.

(10) Patent No.: US 12,319,283 B2
(45) Date of Patent: Jun. 3, 2025

(54) VEHICLE CONTROL METHOD AND DEVICE, COMPUTER STORAGE MEDIUM, AND VEHICLE

(71) Applicant: NIO TECHNOLOGY (ANHUI) CO., LTD, Hefei (CN)

(72) Inventors: Zelei Zhou, Shanghai (CN); Xianhui Zhang, Shanghai (CN); Yang Xu, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 259 days.

(21) Appl. No.: 17/825,084

(22) Filed: May 26, 2022

(65) Prior Publication Data

US 2022/0379886 A1    Dec. 1, 2022

(30) Foreign Application Priority Data

Jun. 1, 2021    (CN) .......................... 202110607016.9

(51) Int. Cl.
*B60W 30/14*    (2006.01)
*B60W 30/06*    (2006.01)
(Continued)

(52) U.S. Cl.
CPC .......... *B60W 30/143* (2013.01); *B60W 30/06* (2013.01); *B60W 30/18036* (2013.01);
(Continued)

(58) Field of Classification Search
CPC .............. B60W 30/143; B60W 30/06; B60W 30/18036; B60W 40/02; B60W 40/105;
(Continued)

(56) References Cited

U.S. PATENT DOCUMENTS

2009/0254249 A1* 10/2009 Ghoneim ........... B60G 17/0162
                                                         701/37
2014/0309834 A1   10/2014 Choi et al.
(Continued)

FOREIGN PATENT DOCUMENTS

EP    2106936    10/2009
EP    3446948    2/2019

OTHER PUBLICATIONS

Extended Search Report for European Patent Application No. 2216544.1, dated Sep. 13, 2022, 10 pages.

*Primary Examiner* — Jason Holloway
*Assistant Examiner* — Elizabeth Rose Neleski
(74) *Attorney, Agent, or Firm* — Sheridan Ross P.C.

(57) ABSTRACT

The invention provides a vehicle control method and device, a computer storage medium, and a vehicle, which are applied to the technical field of automobiles. The vehicle control method includes: determining, based on first information, second information, and third information, whether a vehicle is performing a reverse parking maneuver; comparing a reversing speed with a predetermined first speed when the vehicle is performing the reverse parking maneuver; and if the reversing speed is higher than the predetermined first speed, outputting a first control signal to adjust the reversing speed such that the reversing speed is not higher than the predetermined first speed, where the first information includes information indicating that the vehicle is in reverse gear, the second information indicates an environment surrounding the vehicle, and the third information indicates that the reversing speed is lower than a predetermined second speed, where the predetermined first speed is lower than the predetermined second speed.

7 Claims, 2 Drawing Sheets

(51) Int. Cl.
*B60W 30/18* (2012.01)
*B60W 40/02* (2006.01)
*B60W 40/105* (2012.01)

(52) U.S. Cl.
CPC .......... *B60W 40/02* (2013.01); *B60W 40/105* (2013.01); *B60W 2510/225* (2013.01); *B60W 2710/226* (2013.01)

(58) Field of Classification Search
CPC ...... B60W 2510/225; B60W 2710/226; B60G 17/017; B60G 17/06; B60G 2400/204; B60G 2500/10; B60G 2600/02; B62D 15/0285
See application file for complete search history.

(56) References Cited

U.S. PATENT DOCUMENTS

2016/0114726 A1* 4/2016 Nagata ................... B60Q 9/007
340/435
2019/0061740 A1* 2/2019 Ohira ................... B60W 30/06

\* cited by examiner

1000

| Determine, based on first information, second information, and third information whether a vehicle is performing a reverse parking maneuver, where the first information includes information indicating that the vehicle is reverse gear, the second information indicates an environment surrounding the vehicle, and the third information indicates that a reversing speed is lower than a predetermined second speed | S110 |

↓

| Compare the reversing speed with the predetermined first speed when the vehicle is performing the reverse parking maneuver, where the predetermined first speed is lower than the predetermined second speed | S120 |

↓

| If the reversing speed is higher than the predetermined first speed, output a first control signal to adjust the reversing speed such that the reversing speed is not higher than the predetermined first speed | S130 |

VEHICLE CONTROL METHOD AND DEVICE, COMPUTER STORAGE MEDIUM, AND VEHICLE

CROSS-REFERENCE TO RELATED APPLICATION

This application claims the benefit of China Patent Application No. 202110607016.9 filed on Jun. 1, 2021, the entire content of which is incorporated herein by reference in its entirety.

TECHNICAL FIELD

The invention relates to the technical field of automobiles, and in particular to a vehicle control method and device, a computer-readable storage medium, and a vehicle.

BACKGROUND ART

In order to confine a parking position of a vehicle and prevent the vehicle from reversing out of a parking space, parking stops are often set in the parking space. Also, the parking stops are typically set at a low position under the vehicle. This makes it difficult for a driver to know the specific position of the parking stops when reversing into the parking space due to the occlusion of a vehicle body, which makes it difficult to react to ease the collision with the parking stops. This leads to the collision of the vehicle with the parking stops during the reversing process, resulting in excessive impact, vehicle body tilting and other conditions, which brings a poor riding experience to the driver and passengers in the vehicle.

It is therefore desirable for a solution that enables better control of the vehicle when the vehicle is reversed into a parking space.

SUMMARY OF THE INVENTION

In order to solve or at least alleviate one or more of the above problems, the following technical solutions are provided.

According to an aspect of the invention, a vehicle control method is provided. The method includes: determining, based on first information, second information, and third information, whether a vehicle is performing a reverse parking maneuver; comparing a reversing speed with a predetermined first speed when the vehicle is performing the reverse parking maneuver; and if the reversing speed is higher than the predetermined first speed, outputting a first control signal to adjust the reversing speed such that the reversing speed is not higher than the predetermined first speed, where the first information includes information indicating that the vehicle is in reverse gear, the second information indicates an environment surrounding the vehicle, and the third information indicates that the reversing speed is lower than a predetermined second speed, where the predetermined first speed is lower than the predetermined second speed.

In addition to or in lieu of the above solution, the vehicle control method further includes: determining the second information based on a signal input by a vehicle sensor.

In addition to or in lieu of the above solution, a suspension damping of a rear axle of the vehicle is further compared with a predetermined suspension damping when the vehicle is performing the reverse parking maneuver; and if the suspension damping of the rear axle is lower than the predetermined suspension damping, a second control signal is output to cause the suspension damping of the rear axle to increase.

In addition to or in lieu of the above solution, the second control signal is associated with the first control signal.

In addition to or in lieu of the above solution, that determining whether the vehicle is performing the reverse parking maneuver is further based on fourth information from an auto parking assist system, the fourth information indicating an auto parking state of the vehicle.

In addition to or in lieu of the above solution, the first control signal adjusts the reversing speed in such a manner that a reversing distance of the vehicle meets a predetermined reversing distance.

According to another aspect of the invention, a vehicle control device is provided. The vehicle control device includes: a determination apparatus, configured to determine, based on first information, second information, and third information, whether a vehicle is performing a reverse parking maneuver, and generate a reverse parking signal when the vehicle is performing the reverse parking maneuver; a comparison apparatus, configured to compare a reversing speed with a predetermined first speed based on the reverse parking signal; and an output apparatus, configured to, if the reversing speed is higher than the predetermined first speed, output a first control signal to adjust the reversing speed such that the reversing speed is not higher than the predetermined first speed, where the first information includes information indicating that the vehicle is in reverse gear, the second information indicates an environment surrounding the vehicle, and the third information indicates that the reversing speed is lower than a predetermined second speed, where the predetermined first speed is lower than the predetermined second speed.

In addition to or in lieu of the above solution, the vehicle control device further includes: a receiving device, configured to receive a signal from a vehicle sensor and determine the second information based on the received signal.

In addition to or in lieu of the above solution, the comparison apparatus is further configured to compare a suspension damping of a rear axle of the vehicle with a predetermined suspension damping based on the reverse parking signal; the output apparatus is further configured to, if the suspension damping of the rear axle is lower than the predetermined suspension damping, output a second control signal to cause the suspension damping of the rear axle to increase.

In addition to or in lieu of the above solution, the vehicle control device further includes: a coordinative control apparatus, configured to associate the second control signal with the first control signal.

In addition to or in lieu of the above solution, the determination apparatus further determines whether the vehicle is performing the reverse parking maneuver based on fourth information which is input from an auto parking module, the fourth information indicating an auto parking state of the vehicle.

In addition to or in lieu of the above solution, the first control signal adjusts the reversing speed in such a manner that a reversing distance of the vehicle meets a predetermined reversing distance.

According to yet another aspect of the invention, a computer storage medium is provided. The computer storage medium includes instructions which, when executed, perform any of the above vehicle control methods.

According to still another aspect of the invention, a vehicle is provided. The vehicle has any of the above vehicle control devices.

BRIEF DESCRIPTION OF THE DRAWINGS

The above and other objectives and advantages of the invention will be clearer and more thorough from the following detailed description in conjunction with the drawings.

FIG. 1 shows a flowchart of a vehicle control method 1000 according to an embodiment of the invention.

FIG. 2 shows a block diagram of a vehicle control device 2000 according to an embodiment of the invention.

DETAILED DESCRIPTION OF EMBODIMENTS

Figure 3:
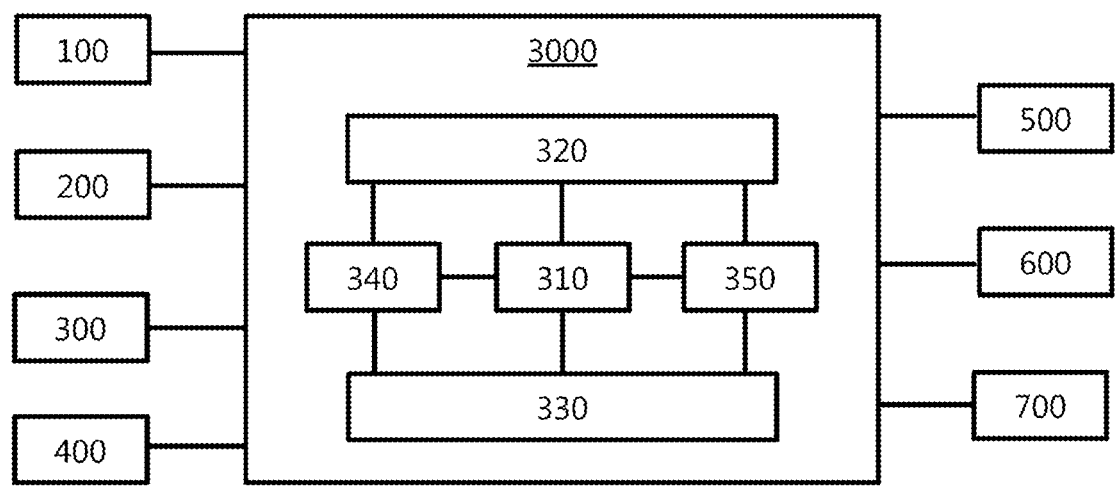
FIG. 3 shows a block diagram of a vehicle control device 3000 according to another embodiment of the invention.

The terms "vehicle", "automobile", or other similar terms herein include general motor vehicles, such as passenger vehicles (including sport utility vehicles, buses, trucks, etc.), various commercial vehicles, ships, aircrafts, etc., and include hybrid vehicles, electric vehicles, plug-in hybrid electric vehicles, etc. A hybrid vehicle is a vehicle with two or more power sources, such as a vehicle powered by a gasoline engine and an electric motor.

Furthermore, the terms such as "first", "second", "third" and the like herein are used to distinguish similar objects, and do not necessarily describe a specific order or precedence.

Furthermore, unless otherwise specified, the terms "including/comprising," "having," and similar expressions herein are intended to mean a non-exclusive inclusion.

Various exemplary embodiments according to the invention will be described below in detail with reference to the drawings.

FIG. 1 shows a flowchart of a vehicle control method 1000 according to an embodiment of the invention. As shown in FIG. 1, in S110, whether a vehicle is performing a reverse parking maneuver is determined based on information indicating that the vehicle is in reverse gear, information indicating an environment surrounding the vehicle, and information indicating that a reversing speed of the vehicle is lower than a predetermined judgment speed. The predetermined judgment speed may be a factory default judgment speed for the vehicle, a judgment speed predetermined based on a driver's preferences, habits etc., or a judgment speed from an auto parking assist (APA) system. As an example, the predetermined judgment speed may be any speed allowing for determining whether the vehicle is in a reversing state, such as 8 km/h, 10 km/h, 12 km/h, etc. When the vehicle is in a reverse parking state, the reversing speed often needs to be lower than the predetermined judgment speed. Furthermore, the information indicating the environment surrounding the vehicle is determined based on a signal input by a vehicle sensor. In the context of this application, the vehicle sensor may be any suitable sensor, such as cameras, laser radar, millimeter wave radar, and ultrasonic radar. The information indicating the environment surrounding the vehicle may be determined directly based on signals sensed by these sensors, or may be determined based on a fusion result of the signals sensed by these sensors. Fusion of the sensor signals can be achieved by an Advanced Driving Assistance System (ADAS). As an example, the information indicating the environment surrounding the vehicle may be information indicating parking signs (e.g., text, pictures, symbols) around the vehicle, information indicating parking lines around the vehicle, and the like.

In S120, the reversing speed is compared with a predetermined target speed when a determination result of S110 indicate that the vehicle is performing the reverse parking maneuver. The predetermined target speed may be a factory default reversing speed for the vehicle, a reversing speed predetermined based on the driver's preferences, habits, etc., or a reversing speed from the auto parking assist (APA) system.

In S130, if the reversing speed is higher than the above predetermined target speed, a first control signal is output, and the reversing speed is adjusted such that the reversing speed is not higher than the predetermined target speed. Those skilled in the art will readily appreciate that the predetermined judgment speed in S110 is often higher than the predetermined target speed here. As an example, the first control signal may be a control signal that controls a vehicle braking system (upon receipt of the control signal by the vehicle braking system, braking force applied to tires may be correspondingly adjusted, thereby adjusting the reversing speed). When the reversing speed is lower than the determination speed in S110, the speed can often be reduced to a very low speed within a short period of time (e.g., to be less than a predetermined target speed) just by applying certain braking force to the vehicle, and the vehicle can brake to halt even within a short period of time. It is readily understood by those skilled in the art that a method of controlling the reversing speed is not limited to increasing the braking force in the above example, but other known means in the art may also be used such that the reversing speed is not higher than the predetermined target speed. Therefore, when the vehicle performing reverse parking is detected, controlling the reversing speed allows the impact and vehicle body tilting during collision with obstacles such as parking stops to be alleviated, thereby improving the riding experience for the driver and passengers in the vehicle. Furthermore, the above adjustment of the braking force for the vehicle may also prevent excessive or insufficient braking.

Optionally, the adjustment of the speed may also be based on a distance between the vehicle and a limit sign around the vehicle body (e.g., a wall around the vehicle, and a parking space line).

Optionally, when an APA function of the vehicle is enabled and provides a predetermined reversing distance, adjustment of the reversing speed also needs to allow a reversing distance of the vehicle to meet the predetermined reversing distance. In the context of this application, the reversing distance refers to a distance between a rear of the vehicle and a parking space line.

Optionally, the vehicle control method 1000 further includes: comparing a suspension damping of a rear axle of the vehicle with a predetermined suspension damping when the vehicle is performing the reverse parking maneuver. If the suspension damping of the rear axle is lower than the predetermined suspension damping, a second control signal (which may, for example, be a control signal to adjust the suspension damping of the vehicle body, thereby allowing for adjustment of the suspension damping of the rear axle of the vehicle) is output, so that the suspension damping of the rear axle is increased, that is, rigidity of the suspension damping is increased. For example, the suspension damping of the rear axle may be increased to the predetermined suspension damping, or the suspension damping can be increased based on a certain coefficient and proportion. Therefore, when the vehicle performing reverse parking is detected, increasing the suspension damping allows vehicle body tilting caused during collision with obstacles such as parking stops to be further alleviated, thereby further improving the riding experience for a driver and passengers in the vehicle.

Optionally, the above second control signal may be associated with the above first control signal, that is, determinations of the first and second control signals are coordinatively considered, allowing the adjustment of the speed and the adjustment of the suspension damping of the rear axle to be coordinated, thereby providing a comfortable riding experience for a driver and passengers in the vehicle. For example, a set of braking force adjustment coefficient and damping adjustment coefficient are obtained by table look-up according to a current speed and a current suspension damping, and an original braking force adjustment controlled quantity and an original damping adjustment controlled quantity are optimized (e.g., multiplied) by these two coefficients, respectively. As an example, when the current speed is high, the braking force adjustment coefficient and the damping adjustment coefficient obtained by table look-up are correspondingly large, so that both braking force and damping are adjusted greatly. This is because if the current speed is high, the vehicle is highly likely to collide with a parking stop at a high velocity, thereby producing great bumping and tilting, and thus both a large braking force to lower the speed and substantial adjustment of the suspension damping to alleviate the possible bumping and tilting are required. As another example, a relatively small damping adjustment coefficient may be selected when a large braking force adjustment coefficient is selected. This is because the large braking force adjustment coefficient allows a reversing speed to quickly decease to a small range, thereby avoiding excessive bumping or tilting. Therefore, only small-range adjustment of the suspension damping is required.

It can be understood by those skilled in the art that coordinative control of speed adjustment and rear axle suspension damping adjustment is not limited to the above table look-up, but may also be achieved through any suitable coordination method such as linear computing, non-linear computing, machine learning, etc.

In one or more embodiments, a determination as to whether a vehicle is performing a reverse parking maneuver is further based on information from an APA. The information from the APA indicates an auto parking state of the vehicle, for example, information indicating that the vehicle is performing an auto reverse parking maneuver, and information indicating that the auto reverse parking maneuver of the vehicle is about to complete (at this point, the vehicle is about to collide with a parking stop). Furthermore, a determination as to whether the vehicle is performing the reverse parking maneuver may also be based on motor torque information, brake pedal information, accelerator pedal information, and the like. The information may, for example, be from a vehicle control unit of the vehicle.

Referring to FIG. 2, FIG. 2 shows a block diagram of a vehicle control device 2000 according to an embodiment of the invention. As shown in FIG. 2, the vehicle control device 2000 includes a determination apparatus 210, a comparison apparatus 220, and an output apparatus 230.

The determination apparatus 210 is configured to determine whether a vehicle is performing a reverse parking maneuver based on information indicating that the vehicle is in reverse gear, information indicating an environment surrounding the vehicle, and information indicating that a reversing speed of the vehicle is lower than a predetermined judgment speed, and to generate a reverse parking signal when the vehicle is performing the reverse parking maneuver. This determination may also be based on information from an APA, motor torque information, brake pedal information, accelerator pedal information, and the like. The information from the APA indicates an auto parking state of the vehicle, and may, for example, be information indicating that the vehicle is performing an auto reverse parking maneuver, and information indicating that the auto reverse parking maneuver of the vehicle is about to complete and that the vehicle is about to collide with a parking stop.

As an example, the predetermined judgment speed may be a factory default judgment speed for the vehicle, a judgment speed predetermined based on a driver's preferences, habits etc., or a judgment speed from the APA. The predetermined judgment speed may be any speed allowing for determining whether the vehicle is in a reversing state, such as 8 km/h, 10 km/h, 12 km/h, etc. When the vehicle is in a reverse parking state, the reversing speed often needs to be lower than the predetermined judgment speed.

As an example, the information indicating the environment surrounding the vehicle may be information indicating parking signs around the vehicle, information indicating parking lines around the vehicle, and the like. Furthermore, the information indicating the environment surrounding the vehicle is determined based on a signal input by a vehicle sensor. Here, a determination based on the signal input by the vehicle sensor may refer to a determination based directly on a signal input by a single sensor, or may refer to a determination based on fusion of signals input by multiple sensors.

The comparison apparatus 220 is configured to compare the reversing speed with a predetermined target speed based on a reverse parking signal generated by the determination apparatus 210.

As an example, the predetermined target speed may be a factory default reversing speed for the vehicle, a reversing speed predetermined based on a driver's preferences, habits etc., or a reversing speed from the APA.

The output apparatus 230 is configured to, if the reversing speed is higher than the above predetermined target speed, output a first control signal to adjust the reversing speed such that the reversing speed is not higher than the predetermined target speed. Those skilled in the art will readily appreciate that the foregoing predetermined judgment speed is often higher than the predetermined target speed here. As an example, the first control signal may be a control signal that controls a vehicle braking system (upon receipt of the control signal by the vehicle braking system, braking force applied to tires may be correspondingly adjusted, thereby adjusting the reversing speed). When the reversing speed is lower than the aforementioned judgment speed, the speed can often be reduced to a very low speed within a short period of time (e.g., to be less than the predetermined target speed) just by applying certain braking force to the vehicle, and the vehicle can brake to halt even within a short period of time. It can be seen that when the vehicle is performing reverse parking, the vehicle control device 2000 can adjust braking force to control the reversing speed to alleviate the impact and vehicle body tilting during collision with obstacles such as parking stops, improving the riding experience for a driver and passengers in the vehicle.

Optionally, adjustment of the reversing speed may also be based on a distance between the vehicle and a limit sign around the vehicle body (e.g., a wall around the vehicle, a parking space line, etc.). Optionally, when an APA function of the vehicle is enabled and provides a predetermined reversing distance, adjustment of the speed also needs to allow a reversing distance of the vehicle to meet the predetermined reversing distance.

In an embodiment, the vehicle control device 2000 further includes a receiving device (not shown in FIG. 2). The receiving device may be configured to receive (e.g., from a vehicle control unit of a vehicle) information indicating which gear the vehicle is in, and information indicating a reversing speed of the vehicle. The receiving device may also be configured to receive a signal from a vehicle sensor.

In an embodiment, the comparison apparatus 220 is further configured to compare a suspension damping of a rear axle of a vehicle with a predetermined suspension damping based on a reverse parking signal. Correspondingly, the output apparatus 230 is further configured to, if the suspension damping of the rear axle is lower than the predetermined suspension damping, output a second control signal (which may, for example, be a control signal to adjust the suspension damping of the vehicle body, thereby allowing for adjustment of the suspension damping of the rear axle of the vehicle), so that the suspension damping of the rear axle is increased. For example, the suspension damping of the rear axle may be increased to the predetermined suspension damping, or the suspension damping can be increased based on a certain coefficient and proportion. In this way, the increased suspension damping of the rear axle allows vehicle body tilting caused during collision with obstacles such as parking stops to be further alleviated, thereby further improving the experience for a driver and passengers in the vehicle.

In an embodiment, the vehicle control device 2000 further includes a coordinative control apparatus 340. The coordinative control apparatus 340 is configured to associate a second control signal with a first control signal, thereby coordinating speed adjustment and suspension damping adjustment. Similar to the coordinative control in the aforementioned vehicle control method 1000, a set of braking force adjustment coefficient and damping adjustment coefficient are obtained by table look-up according to a current speed and a current suspension damping, and an original braking force adjustment controlled quantity and an original damping adjustment controlled quantity are optimized (e.g., multiplied) by these two coefficients, respectively. It can be understood by those skilled in the art that coordinative control of braking force adjustment and rear axle suspension damping adjustment is not limited to the above table look-up, but may also be achieved through any suitable coordination method such as linear computing, non-linear computing, machine learning, etc.

FIG. 3 shows a block diagram of a vehicle control device 3000 according to another embodiment of the invention. The vehicle control device 3000 includes a master control unit 310, a speed control unit 320, and a suspension control unit 330.

The master control unit 310 determines whether a vehicle is performing a reverse parking maneuver based on information indicating that the vehicle is in reverse gear, information indicating an environment surrounding the vehicle, and information indicating that a reversing speed of the vehicle is lower than a predetermined judgment speed. The master control unit 310 generates a reverse parking signal when the vehicle is performing the reverse parking maneuver. The predetermined judgment speed may be set in similar way in the vehicle control device 200.

As shown in FIG. 3, the information indicating the vehicle gear and the information indicating the reversing speed may be received from a vehicle control unit 100, and the information indicating the environment surrounding the vehicle may be received from an ADAS unit 200. Furthermore, the above determination as to whether the vehicle is performing the reverse parking maneuver may also be based on motor torque information, brake pedal information, and accelerator pedal information from the vehicle control unit 100. Furthermore, the above determination as to whether the vehicle is performing the reverse parking maneuver may further be based on auto parking state information from an APA unit 400.

The speed control unit 320 in the vehicle control device 3000 compares a current reversing speed with a predetermined target speed based on a reverse parking signal generated by the master control unit 310. If the current reversing speed is higher than the predetermined target speed, the speed control unit 320 generates a first control signal and may send it to a braking system 500 such that the reversing speed of the vehicle is not higher than the predetermined target speed. A signal indicating the speed may be received from a vehicle model unit 300. As an example, the first control signal may be a control signal that controls a vehicle braking system. Upon receipt of the control signal by the vehicle braking system, braking force applied to tires may be correspondingly adjusted, thereby adjusting the reversing speed.

The suspension control unit 330 in the vehicle control device 3000 compares a suspension damping of a rear axle of the vehicle with a predetermined suspension damping based on the reverse parking signal generated by the master control unit 310. If a current suspension damping of the rear axle is lower than the predetermined suspension damping, the suspension control unit 330 generates and sends a damping adjustment signal to a suspension system 600, thereby increasing the suspension damping of the rear axle of the vehicle.

Optionally, the vehicle control device 3000 includes a coordinative control unit 340. The coordinative control unit 340 coordinates speed adjustment by the speed control unit 320 and suspension damping adjustment by the suspension control unit 330. Similar to the coordinative control in the aforementioned vehicle control method 1000, a reversing speed can be adjusted by adjusting braking force. The coordinative control unit 340 may derive (e.g., by table look-up) a set of braking force adjustment coefficient and damping adjustment coefficient from the vehicle's current speed, braking force, suspension damping, and other state quantities. The braking force adjustment coefficient is sent to the speed control unit 320 to optimize (e.g., multiply) an original braking force adjustment controlled quantity. Similarly, the damping adjustment coefficient is sent to the suspension control unit 330 to optimize (e.g., multiply) an original damping adjustment controlled quantity. It will be readily appreciated by those skilled in the art that a coordination manner of the coordinative control unit 340 may also be any appropriate coordinative control method for braking force adjustment and suspension damping adjustment according to any appropriate vehicle and environmental parameters. It is also readily understood by those skilled in the art that the manner of adjusting a vehicle speed is not limited to adjusting vehicle braking force in the above example, but the reversing speed of the vehicle may be adjusted in other known manners.

Optionally, the vehicle control device 3000 includes a state management unit 350. The state management unit 350 is used to receive various state parameters of the vehicle, such as vehicle control parameters, APA state parameters, ADAS state parameters, vehicle model parameters, etc., and performs collection and analysis on these parameters to further feed the parameters obtained from the collection and analysis to the speed control unit 320 and the suspension control unit 330. The state management unit 350 may also generate a fault signal when the vehicle control device 3000 fails. The fault signal is sent to a Human Machine Interface (HMI) 700 of the vehicle to notify a driver or passengers in the vehicle.

The vehicle control device according to one embodiment of the invention is included in an advanced driving assistance system ADAS of a vehicle.

The vehicle control device according to an embodiment of the invention is incorporated into a vehicle.

It is to be understood that some of the block diagrams shown in the accompanied drawings of this application are functional entities and do not necessarily correspond to physically or logically independent entities. These functional entities may be implemented in the form of software, in one or more hardware modules or integrated circuits, or in different networks and/or processor apparatuses and/or micro-controller apparatuses.

It is also to be understood that the vehicle control method according to the foregoing embodiments of the invention can be implemented by a computer program. The computer program may take the form of instructions stored on a computer storage medium. By way of example, such a computer storage medium can include RAM, ROM, EPROM, EEPROM or an optical disk storage device, a magnetic disk storage device or other magnetic storage device, or any other media capable of carrying or storing desired program code in the form of machine-executable instructions or data structures and capable of being accessed by a processor.

In conclusion, the vehicle control solutions proposed in the invention may identify that a vehicle is performing a reverse parking maneuver based on the gear and speed of the vehicle, an environment surrounding the vehicle and other information, and adjust a reversing speed, suspension damping and other parameters accordingly to at least alleviate the collision with parking stops and other obstacles, reducing vehicle body tilting, and improving reverse parking experience of occupants in the vehicle.

Although only some implementations of the invention are described above, a person of ordinary skill in the art should understand that the invention may be implemented in multiple other forms without departing from the essence and scope of the invention. Accordingly, the presented examples and implementations are considered to be illustrative rather than restrictive, and the invention may encompass various modifications and replacements without departing from the spirit and scope of the invention that are defined by the appended claims.

The invention claimed is:

1. A vehicle control method, comprising:
   determining that a vehicle is performing a reverse parking maneuver based on first information, second information, and third information;
   comparing a reversing speed with a predetermined first speed and comparing a suspension damping of a rear axle of the vehicle with a predetermined suspension damping when the vehicle is performing the reverse parking maneuver; and
   under the condition that the reversing speed is higher than the predetermined first speed, outputting a first control signal to adjust the reversing speed such that the reversing speed is not higher than the predetermined first speed,
   under the condition that the suspension damping of the rear axle is lower than the predetermined suspension damping, a second control signal is output to cause the suspension damping of the rear axle to increase, wherein the second control signal is associated with the first control signal,
   wherein the first information comprises information indicating that the vehicle is in reverse gear, the second information indicates an environment surrounding the vehicle, and the third information indicates that the reversing speed is lower than a predetermined second speed,
   wherein the predetermined first speed is lower than the predetermined second speed.

2. The vehicle control method according to claim 1, wherein
   determining that the vehicle is performing the reverse parking maneuver is further based on fourth information from an auto parking assist system,
   the fourth information indicating an auto parking state of the vehicle.

3. The vehicle control method according to claim 1, wherein
   the first control signal adjusts the reversing speed in such a manner that a reversing distance of the vehicle meets a predetermined reversing distance.

4. A vehicle control device, comprising:
   a determination apparatus configured to determine that a vehicle is performing a reverse parking maneuver based on first information, second information, and third information, and generate a reverse parking signal when the vehicle is performing the reverse parking maneuver;
   a comparison apparatus configured to compare a reversing speed with a predetermined first speed based on the reverse parking signal, and compare a suspension damping of a rear axle of the vehicle with a predetermined suspension damping based on the reverse parking signal; and
   an output apparatus configured to,
      under the condition that the reversing speed is higher than the predetermined first speed, output a first control signal to adjust the reversing speed such that the reversing speed is not higher than the predetermined first speed,
      under the condition that the suspension damping of the rear axle is lower than the predetermined suspension damping, output a second control signal to cause the suspension damping of the rear axle to increase; and
   a coordinative control apparatus, configured to associate the second control signal with the first control signal,
   wherein the first information comprises information indicating that the vehicle is in reverse gear, the second information indicates an environment surrounding the vehicle, and the third information indicates that the reversing speed is lower than a predetermined second speed,
   wherein the predetermined first speed is lower than the predetermined second speed.

5. The vehicle control device according to claim 4, wherein
   the determination apparatus further determines that the vehicle is performing the reverse parking maneuver based on fourth information which is input from an auto parking module,
   the fourth information indicating an auto parking state of the vehicle.

6. The vehicle control device according to claim 4, wherein the first control signal adjusts the reversing speed in such a manner that a reversing distance of the vehicle meets a predetermined reversing distance.

7. A vehicle, comprising the vehicle control device according to claim 4.

\* \* \* \* \*